United States Patent
Debnath et al.

(10) Patent No.: US 11,423,262 B2
(45) Date of Patent: Aug. 23, 2022

(54) AUTOMATICALLY FILTERING OUT OBJECTS BASED ON USER PREFERENCES

(71) Applicant: NEC Laboratories America, Inc., Princeton, NJ (US)

(72) Inventors: Biplob Debnath, Princeton, NJ (US); Debayan Deb, Okemos, MI (US); Srimat Chakradhar, Manalapan, NJ (US)

(73) Assignee: NEC Corporation

( * ) Notice: Subject to any disclaimer, the term of this patent is extended or adjusted under 35 U.S.C. 154(b) by 187 days.

(21) Appl. No.: 16/522,711

(22) Filed: Jul. 26, 2019

(65) Prior Publication Data

US 2020/0050899 A1 Feb. 13, 2020

Related U.S. Application Data

(60) Provisional application No. 62/715,843, filed on Aug. 8, 2018.

(51) Int. Cl.
  *G06K 9/62* (2022.01)
  *G06N 20/10* (2019.01)
  *G06T 7/00* (2017.01)

(52) U.S. Cl.
  CPC ......... *G06K 9/6269* (2013.01); *G06K 9/6219* (2013.01); *G06K 9/6256* (2013.01); *G06N 20/10* (2019.01); *G06T 7/0002* (2013.01)

(58) Field of Classification Search
  CPC ............. G06K 9/00228; G06K 9/6219; G06K 9/6256; G06K 9/6263; G06K 9/6269;
  (Continued)

(56) References Cited

U.S. PATENT DOCUMENTS 9,576,210 B1 * 2/2017 Liu .................. G06T 11/60
10,852,749 B2 * 12/2020 Tran ................ G06T 7/0002
(Continued)

OTHER PUBLICATIONS

Arnaud Lienhard, Patricia Ladret, Alice Caplier. Low Level Features for Quality Assessment of Facial Images. VISAPP 2015—10th International Conference on Computer Vision Theory and Applications, Mar. 2015, Berlin, Germany, pp. 545-552, ffhal-01133674f (Year: 105).*

(Continued)

*Primary Examiner* — Tsung Yin Tsai
(74) *Attorney, Agent, or Firm* — Joseph Kolodka (57) ABSTRACT

A method is provided for classifying objects. The method detects objects in one or more images. The method tags each object with multiple features. Each feature describes a specific object attribute and has a range of values to assist with a determination of an overall quality of the one or more images. The method specifies a set of training examples by classifying the overall quality of at least some of the objects as being of an acceptable quality or an unacceptable quality, based on a user's domain knowledge about an application program that takes the objects as inputs. The method constructs a plurality of first-level classifiers using the set of training examples. The method constructs a second-level classifier from outputs of the first-level automatic classifiers. The second-level classifier is for providing a classification for at least some of the objects of either the acceptable quality or the unacceptable quality.

19 Claims, 6 Drawing Sheets

(58) Field of Classification Search
CPC ... G06K 9/6267; G06T 7/0002; G06T 7/0004; G06T 2207/20081; G06T 2207/20084; G06T 2207/30164; G06N 3/0454; G06N 3/08; G06N 20/10; G06N 20/20
See application file for complete search history.

(56) References Cited

U.S. PATENT DOCUMENTS

| | | | |
|---|---|---|---|
| 2005/0089246 A1* | 4/2005 | Luo | G06V 40/168 375/E7.182 |
| 2006/0147107 A1* | 7/2006 | Zhang | G06V 10/993 382/286 |
| 2010/0246939 A1* | 9/2010 | Aisaka | H04N 5/23222 382/156 |
| 2015/0018671 A1* | 1/2015 | Marentis | A61B 90/39 600/424 |
| 2017/0061258 A1* | 3/2017 | Chen | G06F 21/84 |
| 2017/0294010 A1* | 10/2017 | Shen | G06T 7/0002 |
| 2018/0068540 A1* | 3/2018 | Romanenko | G06K 9/00718 |
| 2018/0107897 A1* | 4/2018 | Zheng | G11B 27/031 |
| 2018/0211401 A1* | 7/2018 | Lee | G06V 10/751 |
| 2018/0285773 A1* | 10/2018 | Hsiao | G06N 20/20 |
| 2019/0034746 A1* | 1/2019 | Feng | G06T 3/4007 |
| 2019/0228547 A1* | 7/2019 | Chandarana | G01R 33/5608 |

OTHER PUBLICATIONS

P. Liao, H. Lin, P. Zeng, S. Bai, H. Ma and S. Ding, "Facial Image Quality Assessment Based on Support Vector Machines," 2012 International Conference on Biomedical Engineering and Biotechnology, Macau, Macao, 2012, pp. 810-813, doi: 10.1109/iCBEB.2012.221. (Year: 2012).*

C. Wang, "A learning-based human facial image quality evaluation method in video-based face recognition systems," 2017 3rd IEEE International Conference on Computerand Communications (ICCC), Chengdu, China, 2017, pp. 1632-1636, doi: 10.1109/CompComm.2017.8322816. (Year: 2017).*

Z. Wang, D. Liu, S. Chang, F. Dolcos, D. Beck and T. Huang, "Image aesthetics assessment using Deep Chatterjee's machine," 2017 International Joint Conference on Neural Networks (IJCNN), Anchorage, AK, USA, 2017, pp. 941-948, doi: 10.1109/IJCNN.2017.7965953. (Year: 2017).*

Z. Lijun, S. Xiaohu, Y. Fei, D. Pingling, Z. Xiangdong and S. Yu, "Multi-branch Face Quality Assessment for Face Recognition," 2019 IEEE 19th International Conference on Communication Technology (ICCT), Xi'an, China, 2019, pp. 1659-1664, doi: 10.1109/ICCT46805.2019.8947255. (Year: 2019).*

Image Aesthetics Assessment using Deep Chatterjee's Machine (Year: 2017).*

A Learning-based Human Facial Image Quality Evaluation Method in Video-based Face Recognition Systems (Year: 2017).*

* cited by examiner

AUTOMATICALLY FILTERING OUT OBJECTS BASED ON USER PREFERENCES

RELATED APPLICATION INFORMATION

This application claims priority to U.S. Provisional Patent Application Ser. No. 62/715,843, filed on Aug. 8, 2018, incorporated herein by reference herein its entirety.

BACKGROUND

Technical Field

The present invention relates to information processing and more particularly to automatically filtering out objects based on user preferences.

Description of the Related Art

A problem exists in how can we classify objects detected in videos or images to be of acceptable or unacceptable quality for a target application. Using Artificial Intelligence (AI) technologies, different objects (face, tattoo, vehicle, and so forth) can be detected in videos and images. Whether the quality of the detected object is "good" (acceptable) or "bad" (unacceptable) depends on the application that will use the image of the detected object. Such decisions are often made by the user of the application, and the user leverages domain knowledge about the application to make the decision. For example, a face detector may output 20 faces from an image taken at a shopping mall. However, only 5 faces (out of 20) may be acceptable quality for an application that recognizes faces. The remaining 15 faces may be "unacceptable" due to several reasons like the faces are too small, or blurred, or only side-face is visible, rendering these images to be not useful for facial recognition. Although users want to filter out unacceptable quality objects, there are many (sometimes conflicting) parameters (or features) that have to be taken into consideration to filter out bad quality objects. Users typically go through a long trial and error process to discover effective rules to filter out "bad" objects. This manual process is quite cumbersome. Furthermore, users have to discover an entirely new set of rules for a different target application.

SUMMARY

According to an aspect of the present invention, a method is provided for classifying objects. The method includes detecting, by a hardware processor, objects in a set of one or more images. The method further includes tagging, by the hardware processor, each of the objects with multiple features. Each of the multiple features describe a specific object attribute and having a range of values assigned to assist with a determination of an overall quality of the one or more images. The method also includes specifying a set of training examples by classifying the overall quality of at least some of the objects as being of an acceptable quality or an unacceptable quality, based on a user's domain knowledge about an application program that takes the objects as inputs. The method additionally includes constructing, by the hardware processor, a plurality of first-level automatic classifiers using the set of training examples. The method further includes constructing, by the hardware processor, a second-level automatic classifier from outputs of the first-level automatic classifiers. The second-level automatic classifier is for automatically providing a classification for at least some of the objects. The classification is either the acceptable quality or the unacceptable quality.

According to another aspect of the present invention, a computer program product is provided for classifying objects. The computer program product includes a non-transitory computer readable storage medium having program instructions embodied therewith. The program instructions are executable by a computer to cause the computer to perform a method. The method includes detecting, by a hardware processor, objects in a set of one or more images. The method further includes tagging, by the hardware processor, each of the objects with multiple features. Each of the multiple features describe a specific object attribute and having a range of values assigned to assist with a determination of an overall quality of the one or more images. The method also includes specifying, by the hardware processor, a set of training examples by classifying the overall quality of at least some of the objects as being of an acceptable quality or an unacceptable quality, based on a user's domain knowledge about an application program that takes the objects as inputs. The method additionally includes constructing, by the hardware processor, a plurality of first-level automatic classifiers using the set of training examples. The method further includes constructing, by the hardware processor, a second-level automatic classifier from outputs of the first-level automatic classifiers. The second-level automatic classifier is for automatically providing a classification for at least some of the objects. The classification is either the acceptable quality or the unacceptable quality.

According to yet another aspect of the present invention, a computer processing system is provided for classifying objects. The computer processing system includes a memory for storing program code. The computer processing system further includes a hardware processor for running the program code to detect objects in a set of one or more images. The hardware processor further runs the program code to tag each of the objects with multiple features. Each of the multiple features describe a specific object attribute and having a range of values assigned to assist with a determination of an overall quality of the one or more images. The hardware processor also runs the program code to specify a set of training examples by classifying the overall quality of at least some of the objects as being of an acceptable quality or an unacceptable quality, based on a user's domain knowledge about an application program that takes the objects as inputs. The hardware processor additionally runs the program code to construct a plurality of first-level automatic classifiers using the set of training examples. The hardware processor further runs the program code to construct a second-level automatic classifier from outputs of the first-level automatic classifiers, the second-level automatic classifier for automatically providing a classification for at least some of the objects, the classification being either the acceptable quality or the unacceptable quality.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to automatically filtering out objects based on user preferences specified during training.

In an embodiment, the present invention provides a system and method that observes what a user considers as "good" or "bad" objects for the application (training examples), and the system automatically learns representations and rules to automatically filter out "bad" objects for the application.

For the sake of illustration, various embodiments of the present invention use faces as a general example of an object. A face detector can output many features associated with a face like frontal score, quality, certainty, reliability, roll, tilt, pan, pose, landmarks, etc. While quality is used herein for the sake of illustration, other characteristics other than or in addition to quality can be used. The definition of "good" and "bad" faces varies from person to person as well as across applications. Therefore, embodiments of the present invention look at examples provided by the user about acceptable and unacceptable object images, and learn a model to classify a face as "good" or "bad" for each target application. Manual annotation is required initially to teach the present invention a user's definition of the "good" and "bad" faces, and these include training examples.

The present invention works using an ensemble of SVM (Support Vector Machine) classifiers. It has a 2-level hierarchical SVM architecture. Given a set of faces, the associated feature representations, and user annotated labels ("+1" for "good" and "−1" for "bad"), a SVM classifier is trained on each feature. Each classifier outputs "+1" or "−1" for "good" or "bad" faces, respectively. These set of classifiers form the first level of the SVM architecture. The output of each classifier from the first level is feed as input to a final SVM classifier, which forms the second level of our SVM architecture. Thus, the second level has only a single SVM classifier. The SVM in the second level is trained on the same annotated labels used in the first level and it outputs "+1" or "−1" for "good" or "bad" faces, respectively. Our hierarchical SVM architecture greatly helps to understand and debug the trained model compared to the deep-learning based approach (which is black-box and very hard to understand) as well as using a single SVM (which will be complex). Thus, users can easily interpret the results and retrain the model if necessary to meet their needs.

In an embodiment, images can be labeled as good or bad based on individual features of the image (e.g., based on pose, angle, inter-eye distance, etc.). Alternatively, we only ask for labeled images as "good" or "bad", and use the same labels when we work with individual features like pose, etc.

Another option is to take additional labels for one or more features. For example, we could take images marked as good or bad, based on the pose for example. Therefore, we could have zero or more images labeled based on the feature as well, in addition to the overall labeling of an image as good or bad.

Further, in an embodiment, we can work with images labeled only by using their feature, that is, we do not have any image labeled as good or bad independent of the feature. In such a case, we could define a quick linear combination of the feature quality measures to come up with a simple cost function that tags the entire image as "good" or "bad".

In an embodiment, we either have images labeled as good or bad, or have several sets of images, each set being labeled as good or bad by only considering a particular feature. For both cases, we can develop a two-tier SVM approach to automatically determine the "quality" of new images.

It is to be appreciated that while SVMs are described herein with respect to one or more embodiments for the sake of illustration, other machine learning mechanisms and approaches can also be used to implement first and second level classifiers as described herein. These and other variations are readily determined given the teachings of the present invention provided herein.

Figure 1:
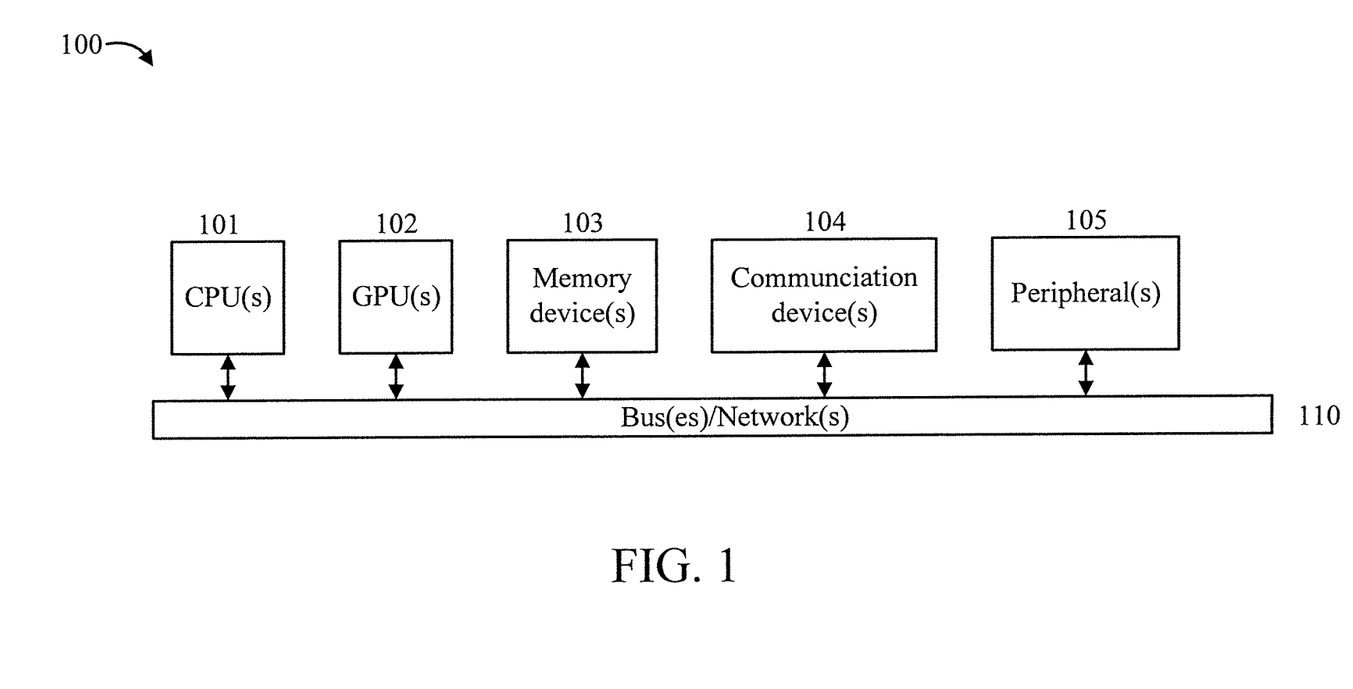
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device (a microphone), a speaker, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

In an embodiment, the one or more memory devices 103 include an entailment module 103A. In another embodiment, the entailment module 103A can be implemented as special purpose hardware (e.g., an Application Specific Integrated Circuit, and so forth).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
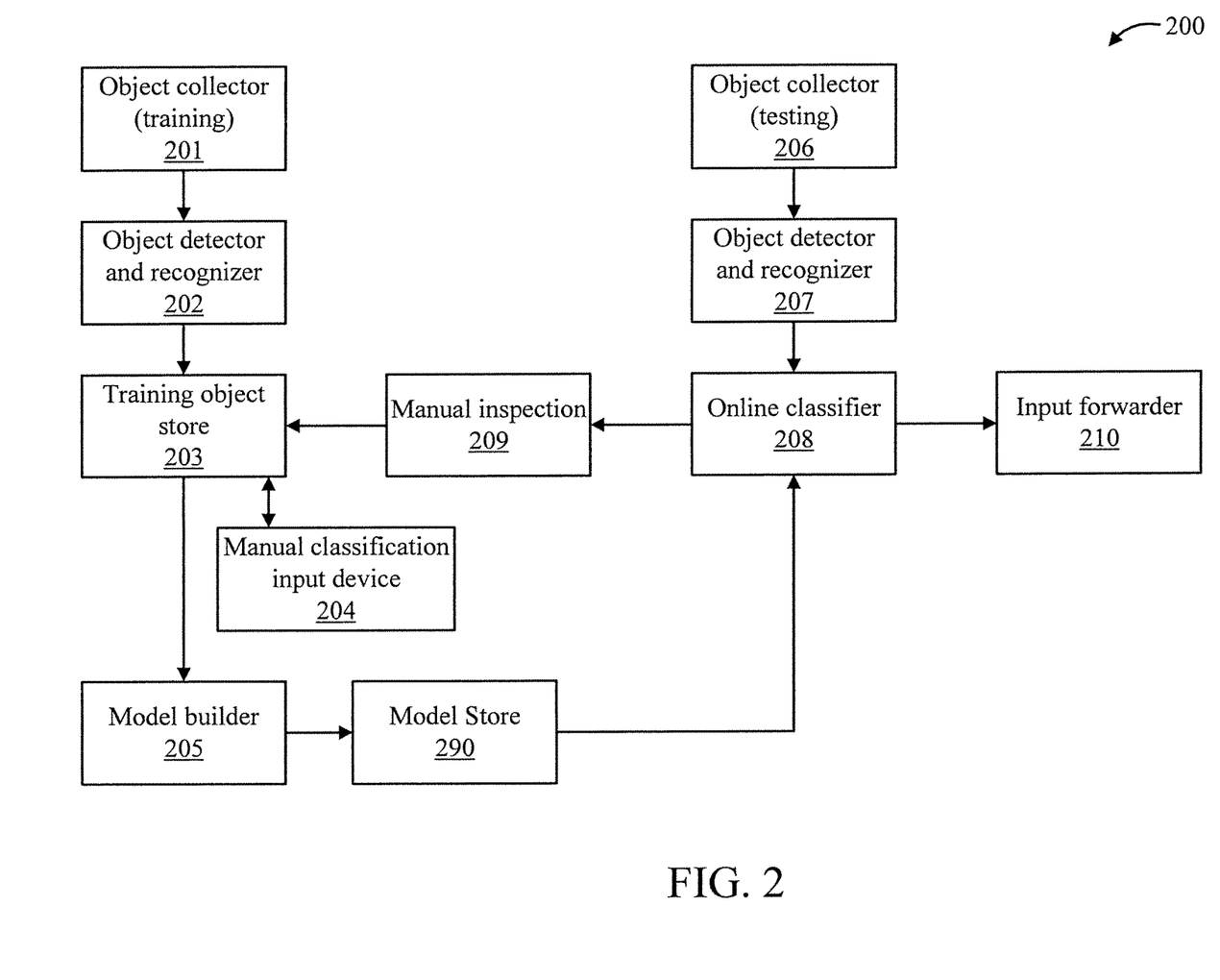
FIG. 2 is a high-level block diagram showing an exemplary system for automatically filtering out objects based on user preferences, in accordance with an embodiment of the present invention.

FIG. 2 is a high-level block diagram showing an exemplary system 200 for automatically filtering out objects based on user preferences, in accordance with an embodiment of the present invention.

The system 200 includes an object collector 201, an object detector 202, a training object store 203, a manual classification input device 204, a model builder 205, an object collector (testing) 206, an object detector 207, an online classifier 208, a manual inspection input device 209, an input forwarder 210, and a model store 290.

The object collector 201 is used for training, and takes images, videos, or live camera feeds from a target application. From the video or camera feeds, individual frames are extracted and sent as an image to the object detector 102.

The object detector and recognizer 202 is used for training, and takes an image and detects and recognizes the objects of interest in the image. The object detector and recognizer 202 also outputs a feature representation of a detected object. In addition, the object detector and recognizer 202 extracts the object's thumbnail, and records the timestamp when an object is detected. Thumbnails help users to review objects' physical looks, while timestamps enable users to select training objects from a specific time range. Thus, the object detector and recognizer 202 detects a face in an image by face detection and then recognizes the face using facial recognition. Hence, the object detection serves the two roles of both detecting a face and recognizing the face (and, thus, the identity of the person).

The object storage 203 is used for training, and takes an object with its feature representation, thumbnail, and detection timestamp, and so forth and stores it in a database so that later users can inspect and label it as a "good" or "bad" object.

Regarding the manual classification input device 204, users inspect all objects from the database in object storage 203, and label them as "good" or "bad" based on their domain knowledge about the target application. These labels are also saved in the database with objects in object storage 203.

The model builder 205 takes a set of objects and labels. The model builder 205 learns a model which can classify an object as "good" or "bad". A user can limit the training objects set size by specifying a time range. For example, a user can choose the last 7 days objects for learning a model.

The object collection 206 is used for testing, and takes images, videos, or live camera feed from the target application. From the video or camera feeds, individual frames are extracted and sent as an image to the object detector 107.

The object detector and recognizer 207 is used for testing, and takes an image and detects and recognizes the objects of interest. The object detector and recognizer 207 also outputs a feature representation of a detected object. In addition, it extracts the object's thumbnail, and records the timestamp when an object is detected. Thus, the object detector and recognizer 207 detects a face in an image by face detection and then recognizes the face using facial recognition. Hence, the object detection serves the two roles of both detecting a face and recognizing the face (and, thus, the identity of the person).

The online classifier 208 takes an object, and classifies it as good or bad using the using model learned on the model builder 205.

Regarding the manual inspection input device, the same can be selectively used so that a user can review the classifier output generated by the online classifier 208, and can selectively store incorrectly classified objects with the correct labels in the object storage 103 to periodically rebuild the model by model builder 205 to improve accuracy of the system. The manual inspection input device is mostly useful in the early stage of the deployment for collecting training objects in order to build a good model.

The input forwarder 210 takes the output of the online classifier 108, filters out the "bad" objects and forwards the "good" objects to the analytics pipeline of the target application. In this way, undue transmission bandwidth consumption, as well as computational resources wasted on "bad" objects, can be avoided.

The model store 290 stores the model built by the model builder 205. The model store 290 is operatively coupled to the online classifier 208 in order to allow the online classifier 208 to access and use the model.

Figure 3:
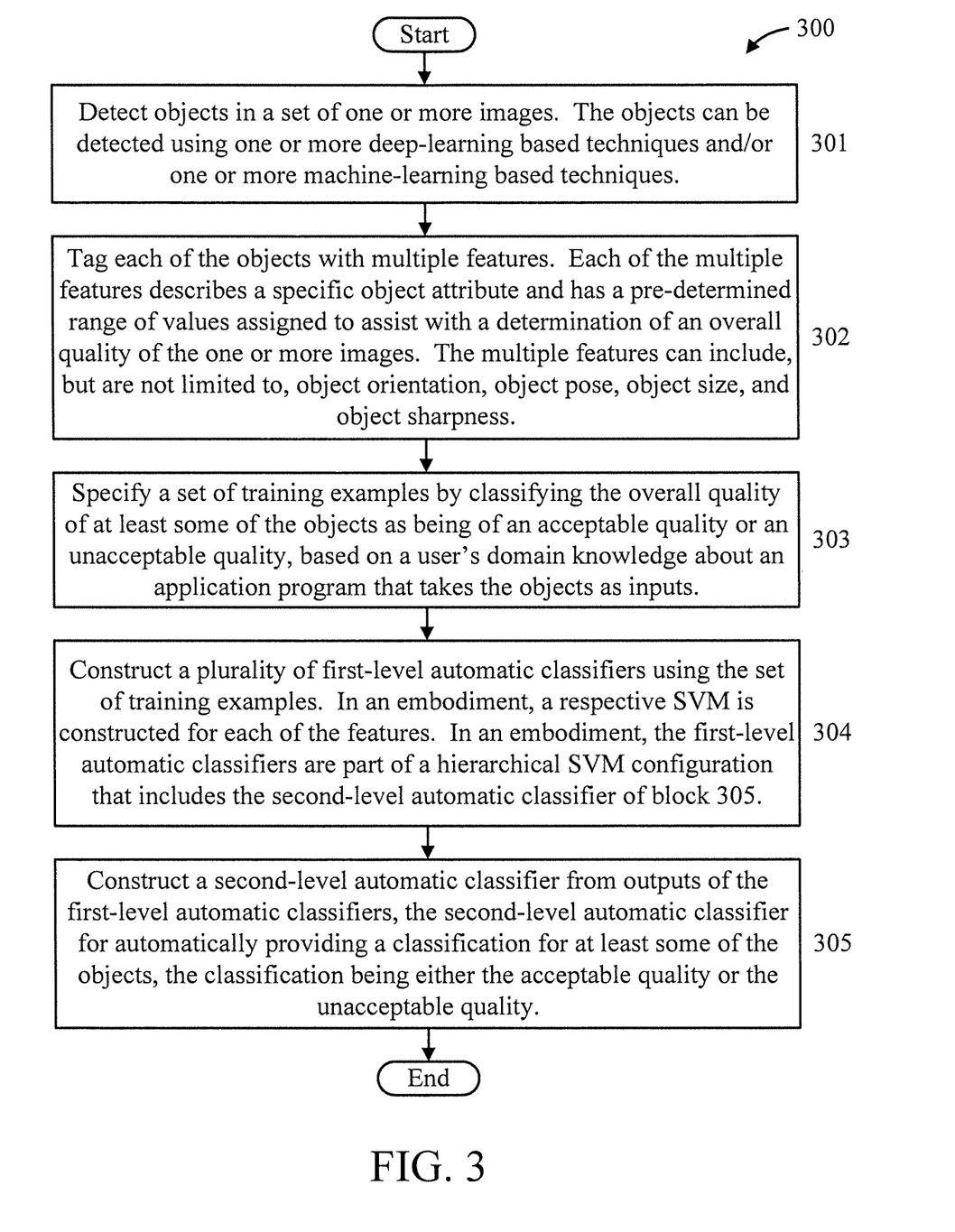
FIG. 3 is a flow diagram showing an exemplary method for automatically filtering out objects based on user preferences, in accordance with an embodiment of the present invention.

FIG. 3 is a flow diagram showing an exemplary method 300 for automatically filtering out objects based on user preferences, in accordance with an embodiment of the present invention. The method 300 can be performed by a system including, but not limited to, a face recognition system.

At block 301, detect objects in a set of one or more images. The objects can be detected using one or more deep-learning based techniques and/or one or more machine-learning based techniques. Exemplary deep-learning techniques that can be used include, but are not limited to, Convolution Neural Network based Residual Neural Networks (Resnets) and its variant architectures. Exemplary machine-learning techniques that can be used include, but are not limited to, SVM based Histogram Of Gradients (HOG) features detection and its variants.

At block 302, tag each of the objects with multiple features. Each of the multiple features describes a specific object attribute and has a range of values assigned to assist with a determination of an overall quality of the one or more images. In an embodiment, at least some of the features can lack independence with respect to each other. The multiple features can include, but are not limited to, object orientation, object pose, object size, and object sharpness.

At block 303, specify a set of training examples by classifying the overall quality of at least some of the objects as being of an acceptable quality or an unacceptable quality, based on a user's domain knowledge about an application program that takes the objects as inputs.

At block 304, construct a plurality of first-level automatic classifiers using the set of training examples. In an embodiment, a respective SVM can be constructed for each of the features. In an embodiment, the first-level automatic classifiers can be part of a hierarchical SVM configuration that includes the second-level automatic classifier of block 305.

At block 305, construct a second-level automatic classifier from outputs of the first-level automatic classifiers, the second-level automatic classifier for automatically providing a classification for at least some of the objects, the classification being either the acceptable quality or the unacceptable quality.

At block 306, filter out the objects classified as being of the unacceptable quality from being forwarded to the application program.

Figure 4:
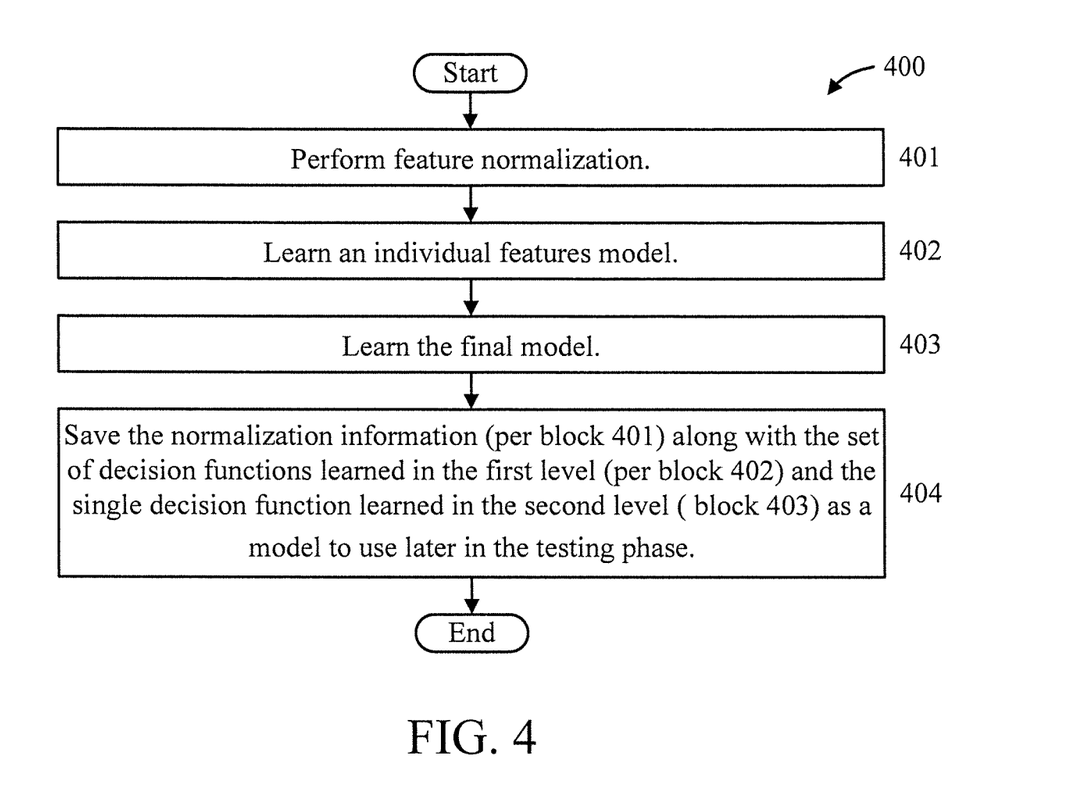
FIG. 4 is a flow diagram showing an exemplary method performed by the model builder of the system of FIG. 2, in accordance with an embodiment of the present invention.

FIG. 4 is a flow diagram showing an exemplary method 400 performed by the model builder 205 of the system 200 of FIG. 2, in accordance with an embodiment of the present invention.

At block 401, perform feature normalization. In an embodiment, block 401 normalizes all features by subtracting their mean and dividing by their standard deviation. Block 401 learns the mean and standard deviation for each feature and saves them for normalizing features later.

At block 402, learn an individual features model. In an embodiment, block 402 takes the normalized feature and user specified labels ("+1" and "−1" for "good" and "bad", respectively), learns a SVM (Support Vector Machine) classifier for each feature. Each SVM classifier outputs "+1" or "−1" for "good" or "bad" objects, respectively. Thus, if an object is represented by n features, then the present invention will learn n different decision functions corresponding to the n SVM classifiers, and for an object these n classifiers will produce a n-dimensional output vector consisting of "+1" and "−1", which is subsequently feed as input to block 403.

At block 403, learn the final model. In an embodiment, block 403 takes the output vectors from block 402 and user specified labels ("+1" and "−1" for "good" and "bad", respectively), and learns a decision function corresponding to a SVM classifier, which outputs the final "+1" or "−1" for "good" or "bad" objects, respectively.

At block 404, save the normalization information (per block 401) along with the set of decision functions learned in the first level (per block 402) and the single decision function learned in the second level (block 403) as a model to use later in the testing phase.

Figure 5:
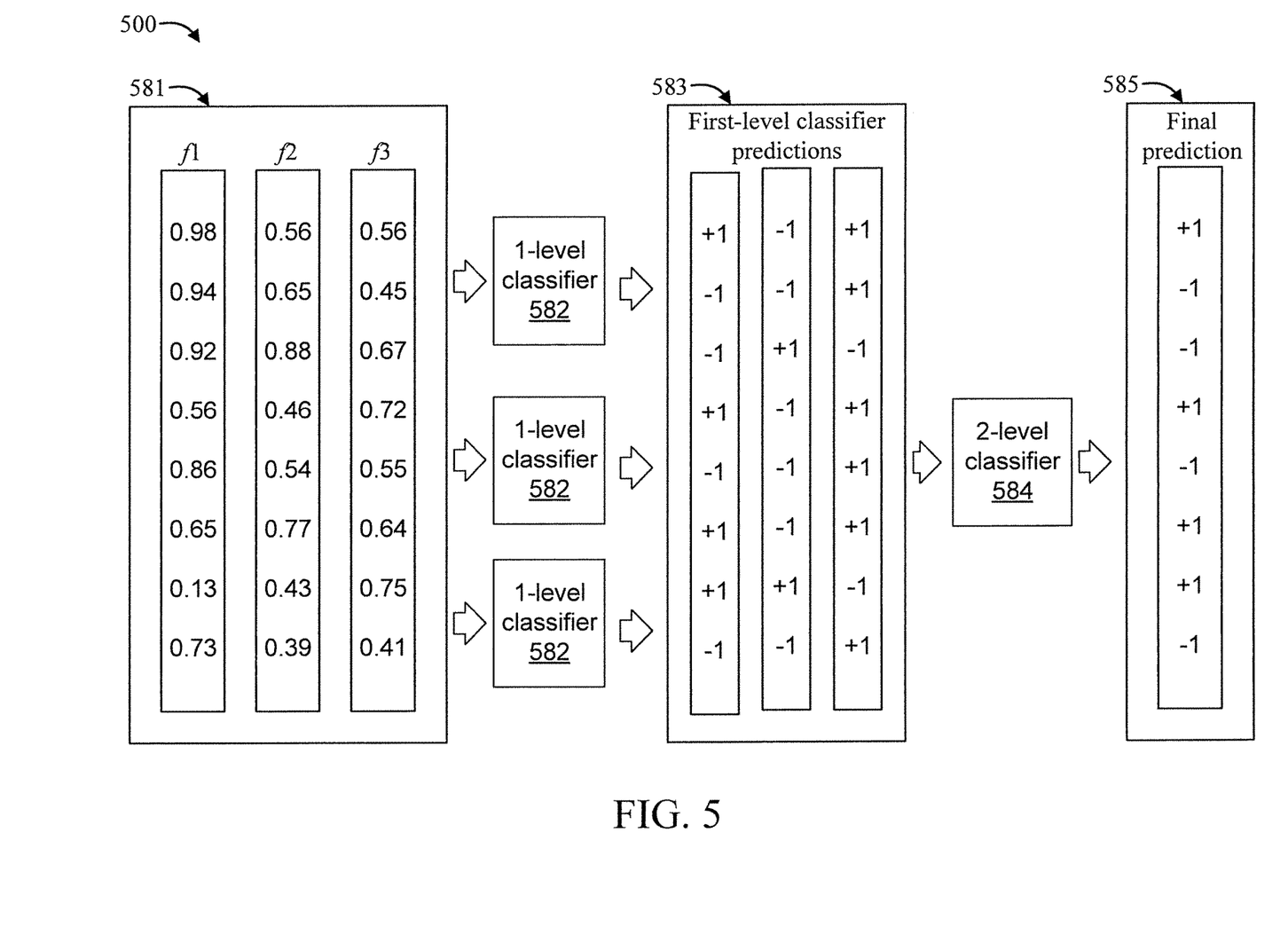
FIG. 5 is a high level block diagram showing an exemplary 2-level SVM architecture/methodology, in accordance with an embodiment of the present invention.

FIG. 5 is a high level block diagram showing an exemplary 2-level SVM architecture/methodology 500, in accordance with an embodiment of the present invention.

The example of FIG. 5 involves three features f1, f2, and f3. The hierarchical SVM architecture has two levels, where the set of classifiers in block 402 of FIG. 4 form the first layer, while the single classifier in block 403 of FIG. 4 forms the second level. Intuitively, blocks 401 and 402 act together as a transformation layer, which transforms an object represented by an arbitrary set of values to a set having only "+1" and "4", thus, making it easier for a user to interpret or understand the model learned in block 403.

Referring to FIG. 5, at block 505, apply normalized features 581 (f1, f2, and f3) to $1^{st}$ level classifiers 582 that are related to the individual features to obtain predictions 583 from the $1^{st}$ level classifiers.

At block 510, apply the predictions 583 from the $1^{st}$ level classifiers 582 as inputs to the $2^{nd}$ level classifier 584 to obtain a final prediction 585 from the $2^{nd}$ level classifier.

Figure 6:
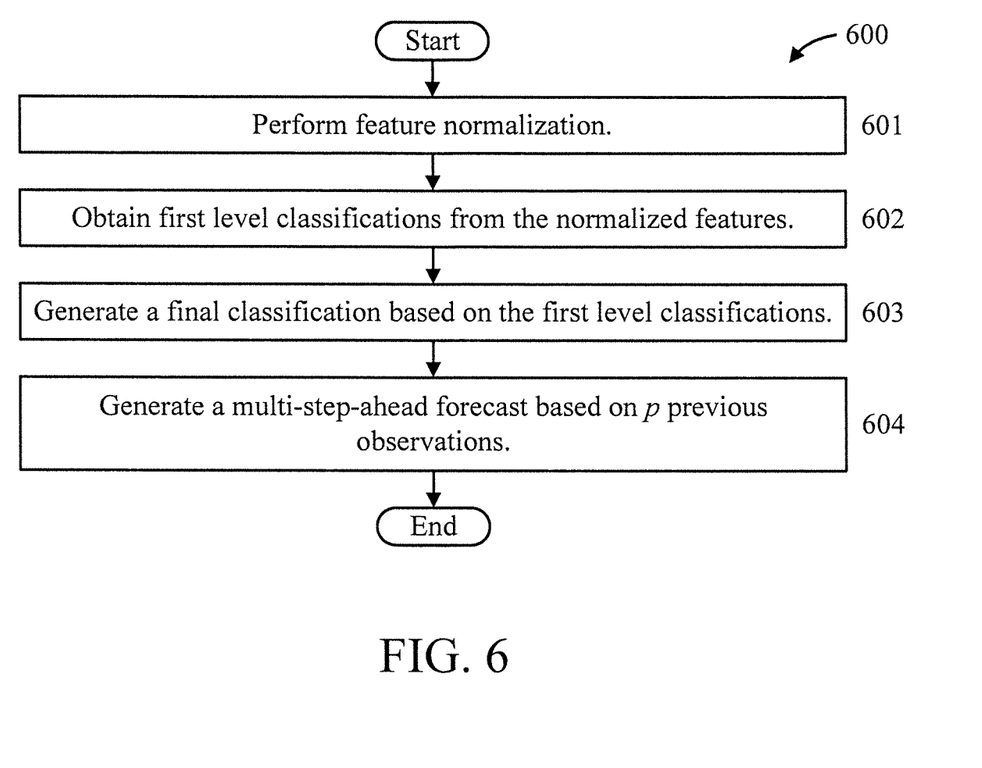
FIG. 6 is a flow diagram showing a method performed by the online object classifier of the system of FIG. 2, in accordance with an embodiment of the present invention.

FIG. 6 is a flow diagram showing a method 600 performed by the online object classifier 208 of the system 200 of FIG. 2, in accordance with an embodiment of the present invention. In general, method 600 takes an object and its thumbnail (in the case a user wants to inspect the output) and finally classifies it as a "good" or "bad" object using the model learned by the model builder 205.

At block 601, perform feature normalization. In an embodiment, block 601 can normalize an object's feature representation by the normalization information (e.g., mean and standard deviation) learned per block 401.

At block 602, obtain first level classifications from the normalized features. Block 602 takes the normalized feature representation from block 601, and uses the decision functions learned in block 402 to produce either a "+1" or "−1" output for each function. The outputs form a vector and act as an input for block 603.

At block 603, generate a final classification based on the first level classifications. In an embodiment, block 603 takes the output vector from block 502 and uses the decision function learned in 403 to output either "+1" or "−1" to classify an object as "good" or "bad", respectively. At block 604, generate a multi-step ahead forecast based on p previous observations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for classifying objects, comprising:
detecting, by a hardware processor, objects in a set of one or more images;
tagging, by the hardware processor, each of the objects with multiple object features including an object orientation, an object pose, an object size, and an object sharpness, each of the multiple object features describing a specific object attribute and having a range of values assigned to assist with a determination of an overall quality of the one or more images;
specifying a set of training examples by classifying the overall quality of at least some of the objects using a binary selection as being of an acceptable object quality or an unacceptable object quality, based on a user's domain knowledge about an application program that takes the objects as inputs;
constructing, by the hardware processor, a plurality of first-level automatic classifiers using the set of training examples; and
constructing, by the hardware processor, a second-level automatic classifier from outputs of the first-level automatic classifiers, the second-level automatic classifier for automatically providing a classification for at least some of the objects, the classification being either the acceptable object quality or the unacceptable object quality.

2. The method of claim 1, where said detecting step detects the objects using one or more deep-learning based techniques.

3. The method of claim 1, where said detecting step detects the objects using one or more machine-learning based techniques.

4. The method of claim 1, where each of the multiple object features that are detected are not independent with respect to each other.

5. The method of claim 1, further comprising training the second-level classifier using a same set of annotated labels as used to train the first-level classifiers.

6. The method of claim 1, wherein the method is performed by an object recognition system.

7. The method of claim 1, wherein a respective one of the first-level automatic classifiers is constructed for each respective one of the multiple object features.

8. The method of claim 1, wherein said detecting step further comprises, for a given object from among the multiple objects, extracting a thumbnail image of the given object and storing the thumbnail image and a timestamp indicating a time of detection of the given object in a database, responsive to a detection of the given object.

9. The method of claim 1, further comprising selecting the at least some of the objects within a specific time range, based on the timestamp corresponding thereto.

10. The method of claim 1, wherein the first level-classifiers and the second-level classifier are comprised in a hierarchical Support Vector Machine (SVM) configuration.

11. The method of claim 10, wherein the first level classifiers comprise a respective SVM constructed for each of the multiple object features.

12. The method of claim 10, further comprising periodically rebuilding a model, responsive to acquiring labels for at least some of the objects, the labels being used by the model for the classification.

13. The method of claim 1, further comprising filtering out the objects classified as being of the unacceptable object quality from being forwarded to the application program.

14. The method of claim 1, wherein the outputs from the first-level classifier comprise a n-dimensional output vector of binary values, where n is an integer representing a number of the multiple object features.

15. A computer program product for classifying objects, the computer program product comprising a non-transitory computer readable storage medium having program instructions embodied therewith, the program instructions executable by a computer to cause the computer to perform a method comprising:
   detecting, by a hardware processor, objects in a set of one or more images;
   tagging, by the hardware processor, each of the objects with multiple object features including an object orientation, an object pose, an object size, and an object sharpness, each of the multiple object features describing a specific object attribute and having a range of values assigned to assist with a determination of an overall quality of the one or more images;
   specifying, by the hardware processor, a set of training examples by classifying the overall quality of at least some of the objects using a binary selection as being of an acceptable object quality or an unacceptable object quality, based on a user's domain knowledge about an application program that takes the objects as inputs;
   constructing, by the hardware processor, a plurality of first-level automatic classifiers using the set of training examples; and
   constructing, by the hardware processor, a second-level automatic classifier from outputs of the first-level automatic classifiers, the second-level automatic classifier for automatically providing a classification for at least some of the objects, the classification being either the acceptable object quality or the unacceptable object quality.

16. The computer program product of claim 15, wherein the objects are detected using one or more deep-learning based techniques.

17. The computer program product of claim 15, where the objects are detected using one or more machine-learning based techniques.

18. The computer program product of claim 15, where each of the multiple object features that are detected are not independent with respect to each other.

19. A computer processing system for classifying objects, comprising:
   a memory for storing program code; and
   a hardware processor for running the program code to
      detect objects in a set of one or more images;
      tag each of the objects with multiple object features including an object orientation, an object pose, an object size, and an object sharpness, each of the multiple object features having a range of valises assigned to assist with a determination of an overall quality of the one or more images;
      specify a set of training examples by classifying the overall quality of at least some of the objects using a binary selection as being of an acceptable object quality or an unacceptable object quality, based on a user's domain knowledge about an application program that takes the objects as inputs;
      construct a plurality of first-level automatic classifiers using the set of training examples; and
      construct a second-level automatic classifier from outputs of the first-level automatic classifiers, the second-level automatic classifier for automatically providing a classification for at least some of the objects, the classification being either the acceptable object quality or the unacceptable object quality.

* * * * *